United States Patent [19]

Hottes

[11] Patent Number: 4,860,526
[45] Date of Patent: Aug. 29, 1989

[54] ANGLE DRIVE ASSEMBLY FOR ROTARY CUTTERS

[75] Inventor: Ronald W. Hottes, Selma, Ala.

[73] Assignee: Allied Products Corporation, Chicago, Ill.

[21] Appl. No.: 133,189

[22] Filed: Dec. 15, 1987

Related U.S. Application Data

[63] Continuation-in-part of Ser. No. 870,648, Apr. 29, 1986, abandoned, which is a continuation of Ser. No. 585,576, Mar. 3, 1984, abandoned.

[51] Int. Cl.⁴ ............................................. A01D 34/66
[52] U.S. Cl. .................................... 56/13.6; 74/15.69; 74/385; 74/417; 74/606 R; 56/6
[58] Field of Search ................ 74/606 R, 607, 416, 74/417, 15.69, 665 GB, 385; 56/13.6, 15.2, 6, 16.4

[56] References Cited

U.S. PATENT DOCUMENTS

| | | | |
|---|---|---|---|
| 507,962 | 10/1893 | Beermaker | 74/385 X |
| 1,889,600 | 11/1932 | Hansen | 74/385 |
| 2,236,598 | 4/1941 | Hautzenroeder | 56/15.2 |
| 2,245,078 | 6/1941 | Padgett | 74/607 |
| 2,327,962 | 8/1943 | Drake | 74/606 R X |
| 2,335,510 | 11/1943 | Hansen | 56/15.2 |
| 2,402,637 | 6/1946 | Keese | 74/607 X |
| 2,403,365 | 7/1946 | Hilblom | 56/15.2 |
| 2,421,044 | 5/1947 | Yutz | 74/385 X |
| 2,445,828 | 7/1948 | Heinsohn, Jr. | 74/385 |
| 2,539,934 | 1/1951 | Smith et al. | 56/13.6 |
| 2,764,899 | 10/1956 | West | 74/385 |
| 2,777,272 | 1/1957 | Smith et al. | 56/13.6 |
| 2,782,585 | 2/1957 | Hervey | 56/13.6 |
| 2,786,320 | 3/1957 | Larson | 56/13.6 X |
| 2,944,617 | 7/1960 | Harris | 74/606 R X |
| 2,964,969 | 12/1960 | Eckert | 74/606 R X |
| 3,276,288 | 10/1966 | Fry | 74/606 R |
| 3,369,350 | 2/1968 | Rogers et al. | 56/15.2 X |
| 3,463,029 | 8/1969 | Chow | 74/606 R X |
| 3,972,159 | 8/1976 | Oosterling et al. | 56/295 X |
| 4,019,600 | 4/1977 | Master et al. | 74/606 R X |
| 4,033,518 | 7/1977 | Fleming et al. | 56/13.9 X |
| 4,110,959 | 9/1978 | Oosterling et al. | 56/295 |
| 4,157,004 | 6/1979 | van der Lely | 56/13.6 |
| 4,199,922 | 4/1980 | van der Lely | 56/13.6 |
| 4,314,436 | 2/1982 | Lely | 56/6 X |
| 4,375,836 | 3/1983 | Weichel | 172/40 |
| 4,538,400 | 9/1985 | Hottes | 56/13.6 X |
| 4,575,997 | 3/1986 | van Paradijs et al. | 56/16.4 |

FOREIGN PATENT DOCUMENTS

| | | | |
|---|---|---|---|
| 558831 | 6/1958 | Canada | 56/6 |
| 482730 | 7/1953 | Italy | 74/385 |
| 590118 | 3/1959 | Italy | 74/385 |
| 8002780 | 12/1981 | Netherlands | 56/6 |

Primary Examiner—Rodney M. Lindsey
Attorney, Agent, or Firm—Lockwood, Alex, FitzGibbon & Cummings

[57] ABSTRACT

An angle drive assembly for rotary cutters embodies a basic housing having an output shaft mounted for rotation therein. A cap housing is rotatably coupled in sealed relationship with the basic housing by the cooperation of a peripheral annular member at one end of the basic housing with an annular seat member carried by the adjacent end of the cap housing with there being a seal interposed between the basic housing and the cap housing at the area of coupling. An input shaft is mounted for rotation in the cap housing and is operatively connected to the output shaft.

18 Claims, 2 Drawing Sheets

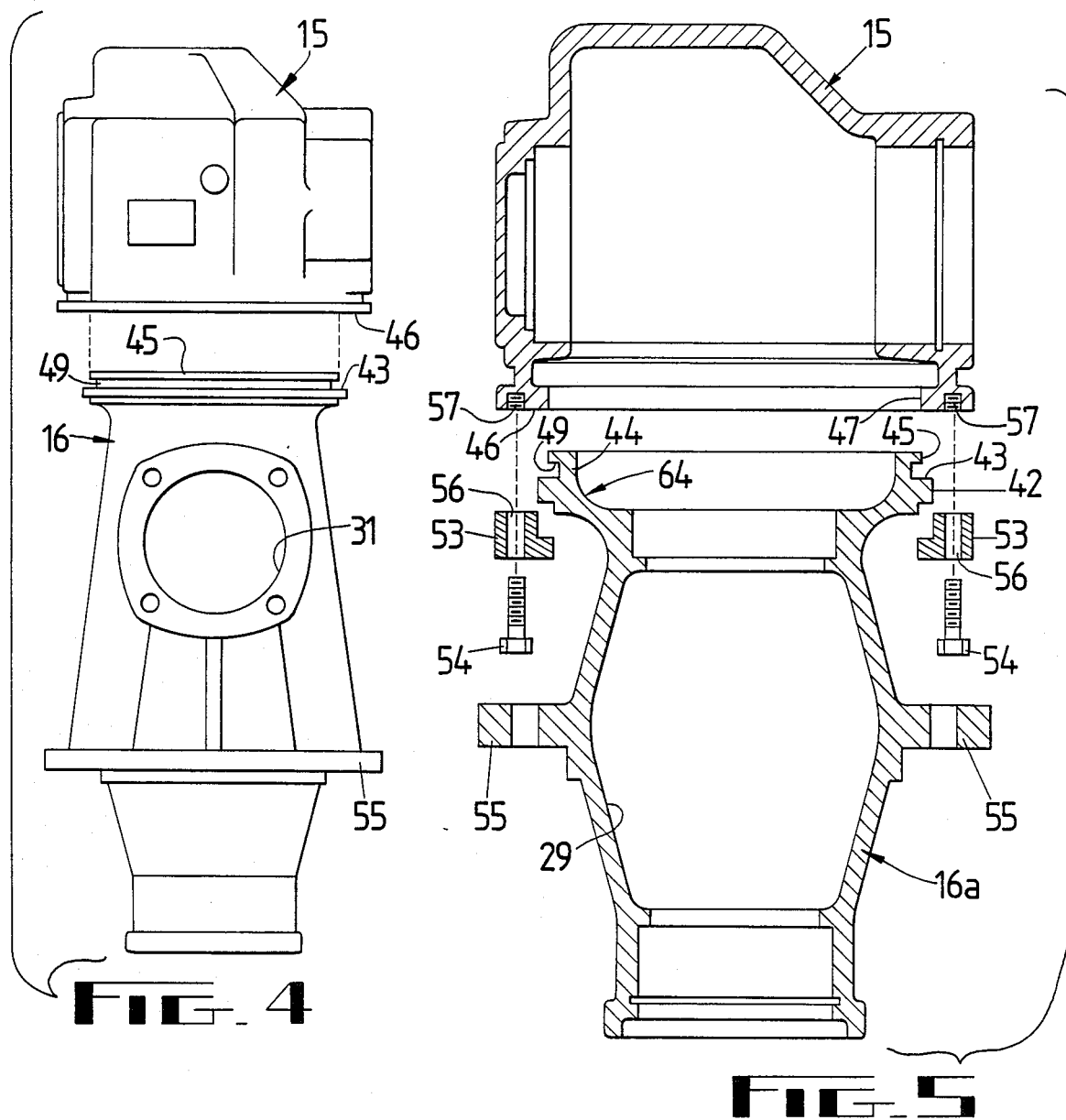
FIG. 4
FIG. 5
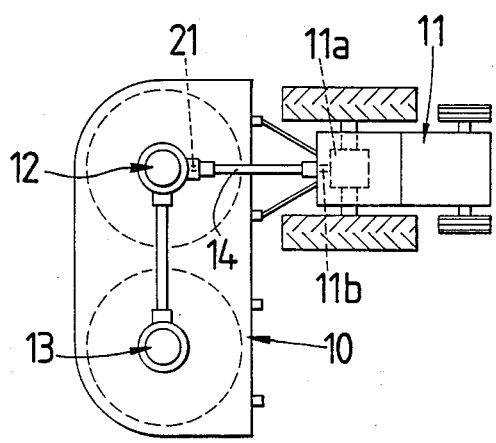
FIG. 1
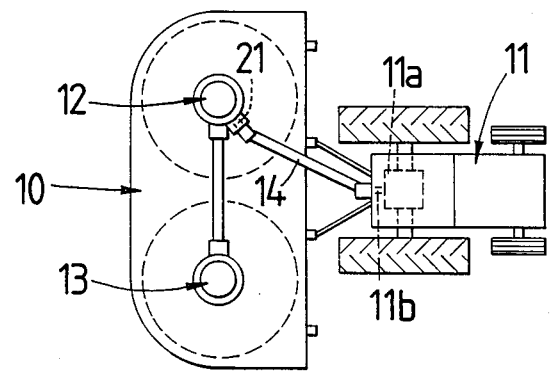
FIG. 2

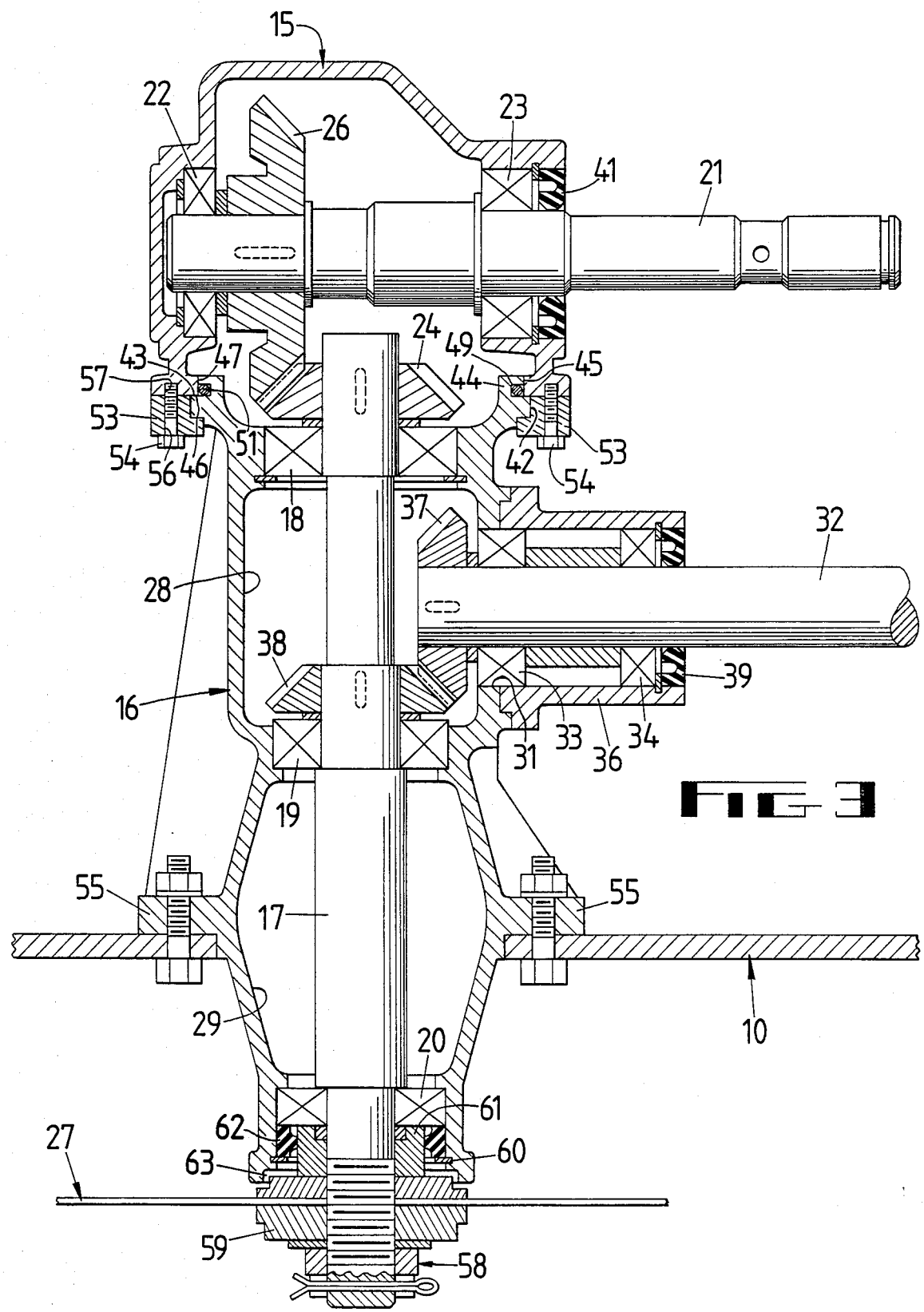

ANGLE DRIVE ASSEMBLY FOR ROTARY CUTTERS

This application is a continuation of application Ser. No. 870,648, filed Apr. 29, 1986, which is a continuation of application Ser. No. 585,576, filed Mar. 2, 1984 now both abandoned.

BACKGROUND OF THE INVENTION

This invention relates to an angle drive assembly for rotary cutters and more particularly to such an assembly which is adapted for use with multi-spindle rotary cutters carried by apparatus employed to mow or cut grass, underbrush and the like.

On medium to large size rotary cutters heretofore employed, each spindle has been driven by means of a separate angle drive which derives its motion from the power take-off of a tractor. For example, with a twin spindle machine, it is common practice to provide a primary drive unit which is connected directly to the power take-off of a tractor and transmits the motion to a spindle keyed on its output shaft and also to a secondary drive unit through a transmission drive having a second spindle keyed thereon.

Difficulties have been encountered with such prior art assemblies due to the fact that they leave a problem of significant importance unsolved, especially, when considering the high speeds involved and the resulting high rotational inertia of the spindles. That is, the rotational speed of the input shaft to the primary drive unit should be maintained constant, as far as possible, in order to avoid poor performance of the rotary cutter and to avoid excessive stresses on the components involved in the transmission of motion. Such nonuniform or irregular speeds encountered with prior art apparatus are usually the result of faulty alignment of the input shaft of the primary drive unit to the power take-off of the tractor, which alignment is almost impossible to achieve due to the necessity of shifting the hitch point of the rotary cutter relative to the tractor to effect different operations, such as the cutting of embankments, drainage ditches and the like. Also of particular importance is the equality of the angles formed both by the input shaft and the power take-off shaft relative to the intermediate shaft used to interconnect the input shaft with the power take-off shaft. Also, it is very desirable that such angles be maintained as small as feasible.

BRIEF SUMMARY OF INVENTION

To overcome the above and other difficulties, it is a primary object of my invention to provide an angle drive assembly which will maintain maximum uniformity of the angular velocities imparted on its input shaft so as to reduce to a minimum the deleterious effects which would result where nonuniform velocities are imparted to the spindles of a rotary cutter.

Another object of my invention is to provide an angle drive assembly of the character designated in which the component parts thereof may be readily adapted for the fabrication of either a primary drive in a multi-spindle machine or of secondary drives.

A further object of my invention is to provide an angle drive assembly which is simple of construction, economical of manufacture and one which performs satisfactorily in every respect without excessive stresses being placed on the various components of the assembly.

The above and other objects are achieved in accordance with my invention by providing a rotary cutter including an angle drive structure. The rotary cutter includes a basic housing having an output shaft mounted for rotation therein and operatively connected to an input shaft carried by a cap housing which is rotatably coupled in sealed relationship with the basic housing. An intermediate shaft operatively connects the input shaft to a power take-off of a towing vehicle. An angle drive assembly connects the intermediate shaft and the input shaft, and another angle drive assembly connects the intermediate shaft and the power take-off. Each angle drive means drives through a range of generally horizontally subtended angles whereby there is substantially simultaneous angular movement of both angle drive means to substantially the same horizontally subtended angle. In this manner, both a primary drive unit and a secondary drive unit of the rotary cutter move in a direction that is generally transverse to the towing direction so that the rotary cutter can be either substantially directly behind, or to one side of, the towing vehicle.

BRIEF DESCRIPTION OF DRAWINGS

Angle drive assemblies embodying features of my invention are illustrated in the accompanying drawings, forming a part of this application, in which:

FIG. 1 is a diagrammatic, top plan view showing one position of connection of a shiftable rotary cutter to a tractor;

FIG. 2 is a diagrammatic, top plan view, corresponding to FIG. 1, showing a different position of connection of the shiftable rotary cutter to a tractor;

FIG. 3 is an enlarged vertical sectional view of an angle drive assembly made in accordance with my invention, which is adapted for use in a primary drive arrangement of a twin spindle rotary cutter and showing the cap housing rotated to position the input shaft at 90° relative to that shown in FIG. 1, for the sake of clarity;

FIG. 4 is an exploded, side elevational view showing the basic shell housing removed from the cap housing; and, FIG. 5 is an exploded, vertical sectional view similar to that shown in FIG. 4 but showing the area of coupling the basic housing to the cap housing being located superjacent a lower biconical chamber of the basic housing for use in a secondary drive arrangement of either a single spindle or multi-spindle rotary cutter.

DETAILED DESCRIPTION

Referring now to the drawings for a better understanding of my invention, I show in FIGS. 1 and 2 a twin spindle rotary cutter assembly which is carried by a suitable translatable frame 10 that is pulled by a suitable vehicle, such as a tractor 11. The twin spindle rotary cutter assembly is shown as comprising a primary drive unit 12 and a secondary drive unit 13 which are interconnected to each other, as shown. An intermediate shaft 14 operatively connects the primary drive unit 12 to a conventional power take-off unit 11$^a$ carried by the tractor 11. The angular position of the intermediate shaft 14 depends upon the position of the frame 10 relative to the tractor 11. That is, the intermediate shaft 14 is subject to angular changes which are required to affect uniform operation of the spindles by applying mechanical stresses of considerable magnitude properly on the shaft 14 and on the apparatus as a whole.

As shown in FIG. 3, the primary drive unit 12 embodies an angle drive assembly which essentially comprises a basic housing 16 which carries a rotatable cap housing 15. An output shaft 17 is mounted for rotation within the basic housing 16 in suitable bearing units 18, 19 and 20, as shown. An input shaft 21 is mounted for rotation within the cap housing 15 in suitable bearing units 22 and 23 with the axis of rotation of the input shaft extending perpendicular to the axis of rotation of the output shaft 17. A bevel gear 24 is keyed to the output shaft 17 in position to mesh with a bevel gear 26 keyed to the input shaft 21, as shown. Since the output shaft 17 and input shaft 21 are arranged perpendicular to each other and are operatively connected to each other by the bevel gears 24 and 26, a rightangle drive is provided which receives its motion from the power take-off unit 11$^a$ of the tractor 11 and then transmits such motion through the input shaft 21 to the output shaft 17 having a conventional rotary cutter unit 27 keyed thereto.

As shown in FIG. 3, the basic housing 16 is divided into two chambers 28 and 29 with the chamber 28 being positioned between the bearing units 18 and 19 and the chamber 29 being positioned between the bearing units 19 and 20. A lateral opening 31 is provided through the basic housing 16 defining the chamber 28 for receiving a transmission shaft 32. The shaft 32 is supported by suitable bearing units 33 and 34 which are mounted within a cylindrical support member 36 secured to the basic housing 16 by suitable means, such as bolts or the like. The transmission shaft 32 extends perpendicular to the output shaft 17 and is operatively connected thereto by bevel gears 37 and 38 with the bevel gear 37 being keyed to the transmission shaft 32 and the bevel gear 38 being keyed to the output shaft 17, as shown.

As shown in FIG. 3, a suitable oil seal 39 is interposed between the transmission shaft 32 and the cylindrical support member 36 to prevent egress of oil from the basic housing 16 and to prevent ingress of dirt and other contaminants into the basic housing. In like manner, an oil seal 41 is interposed between the cap housing 15 and the input shaft 21 to prevent egress of oil from the cap housing 15 and to prevent ingress of dirt and other contaminants.

A rotary coupling is provided between the cap housing 15 and the basic housing 16 to prevent the egress of oil from the cap housing 15 and the ingress of dirt and other contaminants. That is, at the area of coupling the cap housing 15 to the basic housing 16, the basic housing 16 is provided with a peripheral rim 42 having an annular abutment surface 43 which extends transversely of the axis of rotation of the output shaft 17, as shown. A collar-like member 44 is carried by the basic housing 16 and has an annular seat 45 which extends axially relative to the axis of rotation of the output shaft 17. An annular abutting surface 46 is carried by the cap housing 15 in position to cooperate with the annular abutment surface 43, as shown. Also, an annular seat 47 is carried by the cap housing 15 in position to cooperate with the annular seat 45 on the collar-like member 44.

As shown in FIG. 3, the peripheral surface of the collar-like member 44 defining the annular seat 45 extends perpendicular to the abutment surface 43 and is provided with an annular groove 49 which receives an annular sealing member, such as an O-ring 51, which extends around the exterior of the collar-like member 44 at the coupling area of the cap housing 15 with the basic housing 16.

The cap housing 15 is secured to the basic housing 16 by means of suitable clamping assemblies 53 which are secured to the lower end of the cap housing 15 by suitable retaining bolts 54 which pass upwardly through openings 56 in the clamping assemblies and then threadedly engage openings 57 provided at the lower end of the cap housing 15, as shown. Accordingly, the cap housing 15 may be moved to selected angular positions relative to the basic housing 16 and then held at a selected position by tightening the retaining bolts 54.

As shown in FIG. 3, the chamber 29 located underneath the chamber 28 has a biconical configuration. A mounting flange 55 is formed externally of the mid-portion of the biconical chamber for attachment to a suitable structure forming a part of the frame 10, whereby the mounting flange 55 is utilized to attach the basic housing 16 to the frame 10. In view of the fact that the mounting flange 55 is positioned at the major diameter of the biconical chamber 29, it provides an extremely strong construction for supporting the basic housing 16 and the cap housing 15 rotatably connected thereto.

The output shaft 17 and the bevel gears carried thereby are supported entirely within the basic housing 16 by means of the bearing units 18, 19 and 20 which are accommodated by suitable bearing seats, as shown. Preferably, the output shaft 17 is enlarged in diameter in the area between the bearing units 19 and 20 to enable them to be seated in their bearing seats by means of a nut tightening assembly 58, indicated generally at 58. This tightening assembly 58 permits simultaneous locking of the bearing units 19 and 20 and the output shaft 17 carried thereby within the bearing seats and at the same time a tool holder assembly 59 for the rotary cutter 27 is secured non-rotatably to the output shaft 17 in a manner well understood in the art to which my invention relates. Accordingly, as the nut assembly 58 is tightened, the tool or implement holder assembly 59 exerts an axial force which is transferred through a spacer ring 61 onto the bearing unit 20, as shown.

As shown in FIG. 3, an annular gasket 62 is interposed between the external surface of the spacer ring 61 and the adjacent inner surface of the basic housing 16 to provide a fluid-tight seal therebetween. The annular gasket 62 is held against downward axial movement by a suitable retainer ring 60. The spacer ring 61 cooperates with a labyrinth 63 defined by a stepped profile at the lower end of the basic housing 16 and an adjacent mating profile on the tool holder assembly 59 to prevent dirt, grass and the like from reaching the interior of the basic housing 16. Also, the labyrinth 63 prevents grass and the like from wrapping itself around the spacer ring 61 and thus causing damage to the gasket 62.

By locating the mounting flange 55 at the major diameter of the biconical chamber 29, as shown in FIG. 3, the bearing unit 20 is positioned quite close to the area subjected to peak stresses. That is, the bearing unit 20 is located adjacent the tool holder assembly which results in a decreased load on the bearing units and increased life of the apparatus.

It will be noted that the input shaft 21 and the bevel gear 26 keyed thereto are both mounted wholly within the confines of the cap housing 15. Accordingly, the input shaft 21 and the bevel gear 26 would remain in connected relationship to the cap housing 15 upon removal of the cap housing from the basic housing 16.

Referring now to FIG. 5 of the drawings, I show a modified form of my invention wherein similar parts are designated by the same or similar reference numerals as that employed in FIGS. 1 and 2. In accordance with this embodiment, I omit the intermediate chamber 28 from the basic housing indicated at 16$^a$ and move the coupling area between the cap housing 15 and the basic housing 16$^a$, which area is indicated at 64, to a position superjacent or directly above the bearing unit 19. Accordingly, based upon the same inventive concept and by using the same or similar parts as shown in FIGS. 1 and 2, I provide a secondary drive which is particularly adapted for use with rotary cutters.

From the foregoing description, the operation of my improved angle drive assembly will be readily understood. The cap housing 15 is moved to selected angular positions relative to the basic housing 16 by loosening the retaining bolts 54 of the clamping assemblies 53 and then rotating the cap housing 15 until optimum operating conditions are established for the intermediate shaft 14. After establishment of such optimum operating conditions, whereby the intermediate shaft 14 forms with the input shaft 21 and the shaft 11$^b$ of the power take-off unit 11$^a$ equal angles, the retaining bolts 54 are again tightened to thus retain the cap housing 15 at the proper angular position relative to the basic housing 16 to provide optimum operating conditions.

From the foregoing, it will be seen that I have devised an improved angle drive assembly wherein the assembly of the apparatus is greatly simplified since it is possible to assemble the cap housing and its input shaft and the members associated therewith separately from the basic housing and its output shaft and transmission shaft 17 and 32, respectively. It will also be seen that my improved angle drive assembly is economical of manufacture and one which performs satisfactory in every respect without excessive stresses being placed on the various components of the drive assembly.

While I have shown my invention in two forms, it will be obvious to those skilled in the art that it is not so limited, but is susceptible of various other changes and modifications without departing from the spirit thereof.

What I claim is:

1. A rotary cutter device for being pulled behind a towing vehicle having a power take-off, said towing vehicle being movable in a towing direction, said rotary cutter device including a translatable frame, a drive assembly mounted to said translatable frame, and an intermediate shaft drivingly joining said drive assembly with said towing vehicle power take-off, said drive assembly being an angle drive assembly including a primary drive unit comprising:
   (a) a basic housing having an output shaft generally vertically mounted for rotation therein,
   (b) a cap housing coupled in rotatable relationship with said basic housing and having an input shaft generally horizontally mounted for rotation therein and operatively connected to said output shaft at one end, and said input shaft is operatively connected to said intermediate shaft at the other end through one angle drive means for driving said input shaft with said intermediate shaft through a range of generally horizontal subtended angles,
   (c) another angle drive means for driving said intermediate shaft with said power take-off through a range of generally horizontal subtended angles,
   (d) a transmission shaft in driven engagement with said output shaft,
   (e) coupling means for rotatably joining said cap housing onto said basic housing and for selectively orienting the input shaft with respect to the transmission shaft through a plurality of different angular relationships upon rotation of said generally horizontal input shaft with respect to said generally vertical output shaft,
   (f) means for operatively connecting the input shaft to the output shaft and for maintaining this operative connection when the input shaft is selectively oriented with respect to the output shaft, and
   (g) a rotary cutter unit in operative interengagement with an end of said output shaft, said rotary cutter unit having a blade below said translatable frame;
   said drive assembly further includes a secondary drive unit supported by said translatable frame and driven by through said transmission shaft, said secondary drive unit having a rotary cutter blade below said translatable frame, and said secondary drive unit is generally beside said primary drive unit; and
   said coupling means and said operative connection means cooperate to permit movement of said translatable frame and said primary drive unit and secondary drive unit supported thereby, said movement being in a direction generally transverse to the towing direction, and said movement including angular movement of said one angle drive means to a selected one of said generally horizontal subtended angles, said movement further including substantially simultaneous angular movement of said another angle drive means to one of its said generally horizontal subtended angles which is substantially equal to said selected one of the substantially horizontal subtended angles of the one angle drive means.

2. An angle drive assembly as defined in claim 1, wherein said coupling means includes:
   (a) a peripheral rim carried by said basic housing, said peripheral rim having an annular abutment surface extending transversely of the axis of rotation of said output shaft,
   (b) a collar-like member carried by said basic housing and having an annular seat which extends axially relative to said axis of rotation of said output shaft,
   (c) an annular abutting surface carried by said cap housing and cooperating with said annular abutment surface,
   (d) an annular seat carried by said cap housing and cooperating with said annular seat on said collar-like member,
   (e) clamp means operatively connected to said cap housing to clamp said abutment surface on said peripheral rim against said annular abutting surface carried by said cap housing, and
   (f) said coupling means includes sealing means between said basic housing and said cap housing.

3. An angle drive assembly as defined in claim 2 in which said sealing means comprises an annular groove in said collarlike member and a gasket in said annular groove in sealing engagement with said annular seat carried by said cap housing.

4. An angle drive assembly as defined in claim 1, wherein said means for operatively connecting the input shaft to the output shaft and a portion of said input shaft which is adjacent to said connecting means are both mounted within said cap housing.

5. An angle drive assembly as defined in claim 1, wherein said output shaft is mounted within said basic housing.

6. An angle drive assembly as defined in claim 1, wherein an end portion of said transmission shaft is mounted for rotation in a support member carried by said basic housing with said end portion extending inwardly of said basic housing and with the axis of rotation of said transmission shaft extending substantially perpendicular to said output shaft and said end portion is operatively connected in driving relation with said output shaft.

7. An angle drive assembly as defined in claim 1, wherein a portion of said basic housing defines a biconical chamber and a mounting flange is formed externally of a midportion of said biconical chamber.

8. An angle drive assembly as defined in claim 7 in which said coupling means is located superjacent said biconical chamber.

9. An angle drive assembly as defined in claim 2, wherein said means for operatively connecting the input shaft to the output shaft and a portion of said input shaft which is adjacent to said connecting means are both mounted within said cap housing.

10. An angle drive assembly as defined in claim 2, wherein said output shaft is mounted within said basic housing.

11. An angle drive assembly as defined in claim 2, wherein an end portion of said transmission shaft is mounted for rotation in a support member carried by said basic housing with said end portion extending inwardly of said basic housing and with the axis of rotation of said transmission shaft extending substantially perpendicular to said output shaft and said end portion is operatively connected in driving relation with said output shaft.

12. An angle drive assembly as defined in claim 2, wherein a portion of said basic housing defines a biconical chamber and a mounting flange is formed externally of a midportion of said biconical chamber.

13. An angle drive assembly as defined in claim 12, wherein said coupling means is located superjacent said biconical chamber.

14. An angle drive assembly as defined in claim 3, wherein said means for operatively connecting the input shaft to the output shaft and a portion of said input shaft which is adjacent to said connecting means are both mounted within said cap housing.

15. An angle drive assembly as defined in claim 3, wherein said output shaft is mounted within said basic housing.

16. An angle drive assembly as defined in claim 3, wherein an end portion of said transmission shaft is mounted for rotation in a support member carried by said basic housing with said end portion extending inwardly of said basic housing and with the axis of rotation of said transmission shaft extending substantially perpendicular to said output shaft and said end portion is operatively connected in driving relation with said output shaft.

17. An angle drive assembly as defined in claim 3, wherein a portion of said basic housing defines a biconical chamber and a mounting flange is formed externally of a midportion of said biconical chamber.

18. An angle drive assembly as defined in claim 17, wherein said coupling means is located superjacent said biconical chamber.

* * * * *

UNITED STATES PATENT AND TRADEMARK OFFICE
CERTIFICATE OF CORRECTION

PATENT NO. : 4,860,526

DATED : August 29, 1989

INVENTOR(S) : Ronald W. Hottes

It is certified that error appears in the above-identified patent and that said Letters Patent is hereby corrected as shown below:

On the title page:

Under "Related U.S. Application Data", "Continuation-in-part" should read --Continuation--.

Col. 6, line 14, "driven by through said" should read --driven by said--.

Signed and Sealed this

Twenty-third Day of April, 1991

Attest:

HARRY F. MANBECK, JR.

Attesting Officer

Commissioner of Patents and Trademarks